(12) United States Patent
Mochizuki (10) Patent No.: US 7,926,382 B2
(45) Date of Patent: Apr. 19, 2011

(54) STRUCTURE FOR LIMITING ROTATIONAL RANGE OF MANUAL PLATE IN AUTOMATIC TRANSMISSION

(75) Inventor: Shinichi Mochizuki, Fuji (JP)

(73) Assignee: Jatco Ltd (JP)

( * ) Notice: Subject to any disclaimer, the term of this patent is extended or adjusted under 35 U.S.C. 154(b) by 483 days.

(21) Appl. No.: 11/377,874

(22) Filed: Mar. 16, 2006

(65) Prior Publication Data
US 2006/0207372 A1  Sep. 21, 2006

(30) Foreign Application Priority Data
Mar. 18, 2005  (JP) ................................ 2005-080042

(51) Int. Cl.
*B60K 20/00* (2006.01)
(52) U.S. Cl. .................. 74/473.21; 74/473.3; 74/473.36
(58) Field of Classification Search .............. 74/473.21, 74/473.22, 473.24, 473.25, 473.1, 473.3, 74/473.36
See application file for complete search history.

(56) References Cited

U.S. PATENT DOCUMENTS

| | | | | | |
|---|---|---|---|---|---|
| 4,369,867 A | * | 1/1983 | Lemieux | .................... | 192/219.5 |
| 5,277,077 A | | 1/1994 | Osborn | | |
| 5,846,160 A | * | 12/1998 | Tuday | .............................. | 477/99 |
| 6,530,293 B1 | * | 3/2003 | Ruckert et al. | ............. | 74/473.12 |
| 6,658,960 B2 | * | 12/2003 | Babin et al. | ................ | 74/473.28 |
| 2004/0020321 A1 | * | 2/2004 | Whitebread et al. | ........ | 74/473.21 |

FOREIGN PATENT DOCUMENTS

| | | |
|---|---|---|
| JP | 1-307548 A | 12/1989 |
| JP | 1307548 A | 12/1989 |

OTHER PUBLICATIONS

Extended Search Report, dated Aug. 21, 2008, issued in corresponding EP Application No. 06251393.2-1254.

* cited by examiner

*Primary Examiner* — Richard W Ridley
*Assistant Examiner* — Alan B Waits
(74) *Attorney, Agent, or Firm* — Rossi, Kimms & McDowell LLP (57) ABSTRACT

There is provided a structure for limiting the rotational range of a manual plate in an automatic transmission, which is capable of making the manual plate shareable among a plurality of types of automatic transmissions differing in the number of gear positions. In the case where the manual plate is applied to a 5-position automatic transmission, the height of a case-side drive range direction stopper that limits the rotational range of the manual plate is set such that an end of a check plate is fitted into five notches ranging from a parking range notch to a low range notch. In the case where the manual plate is applied to a 4-position automatic transmission, the height of a case-side drive range direction stopper that limits the rotational range of the manual plate is set such that the end of the check plate is fitted into four notches ranging from the parking range notch to a drive range notch. As a result, the manual plate can be shared between the 4-position and 5-position automatic transmissions, and the kinds of parts can be reduced.

4 Claims, 7 Drawing Sheets

Fig. 7

STRUCTURE FOR LIMITING ROTATIONAL RANGE OF MANUAL PLATE IN AUTOMATIC TRANSMISSION

BACKGROUND OF THE INVENTION

1. Field of the Invention

The present invention relates to a structure for limiting the rotational range of a manual plate in an automatic transmission, which prevents over-stroke of the manual plate associated with operation of a manual valve in the automatic transmission in both rotational directions.

2. Description of the Related Art

An automatic transmission is equipped with a manual valve, which is moved to various range positions such as a parking range, a reverse range, a neutral range, and a drive range to change the supplied state of oil pressure to a desired state so that a vehicle can be parked/stopped or run in a desired mode.

An operating system for the manual valve need to offer a crisp feel at the range positions mentioned above so that the driver can get a sense of the range positions. For this reason, the operating system for the manual valve is configured to move the manual valve via a manual plate that is rotated by a driver's selecting operation to offer a crisp feel at each of the range positions.

The manual plate is formed with a plurality of notches therein; a plate spring-loaded check member is fitted into any of the notches to hold the manual plate in position. As the manual plate is rotated, the check member is alternately fitted into the notches to give a crisp feel in the selecting operation.

Also, the manual plate is provided with stopper structures in both rotational directions so as to prevent the manual valve from moving beyond the range positions at both ends.

An example of such a manual plate having stopper structures in both rotational directions is disclosed in Japanese Laid-Open Patent Publication (Kokai) No. H01-307548, for example.

The number of notches to be formed in the manual plate and the amount of rotation from one notch to another are set depending on the number of gear positions selectable by the shift lever (the number of range positions) and the stroke of the shift lever between the gear positions.

That is, different manual plates designed for exclusive use in respective automatic transmissions differing in the number of gear positions selectable by the shift lever have been used.

Thus, there has been the problem that a manual plate cannot be shared between a plurality of types of automatic transmissions, which causes an increase in the kinds of parts.

SUMMARY OF THE INVENTION

It is therefore an object of the present invention to provide a structure for limiting the rotational range of a manual plate in an automatic transmission, which is capable of making the manual plate shareable between a plurality of types of automatic transmissions differing in the numbers of gear positions.

To attain the above object, there is provided a structure for limiting a rotational range of a manual plate in an automatic transmission, comprising a manual plate formed with a plurality of notches at an edge thereof, the manual plate moving in response to movement of a shift lever, a check member that is fitted into the notches of the manual plate, for holding the manual plate in position, and case-side stopper surfaces provided in a transmission case, for coming into abutment with the manual plate to limit a rotational range of the manual plate in both directions, wherein a position of one of the case-side stopper surfaces that limits the rotational range of the manual plate in one direction is selectively set to inhibit the check member from being fitted into the notch located farther than a predetermined one of the notches of the manual plate in the other direction.

According to the present invention, the number of notches into which the check member can be fitted can be changed merely by changing the position of the case-side stopper surface that limits the rotational range of the manual plate in one direction. That is, since the number of notches corresponds to the number of gear positions of an automatic transmission, the manual plate can be shared between automatic transmissions differing in the number of ranges by changing the number of notches into which the check member can be fitted.

Specifically, assuming that the manual plate with five notches formed therein, if the manual plate is applied to a 5-position automatic transmission, the position of the case-side stopper surface is set such that the check member can be fitted into all the five notches. On the other hand, if the manual plate is applied to a 4-position automatic transmission, the position of the case-side stopper surface is set such that the check member can be fitted into four of the five notches formed in the manual plate (the check member is not fitted into the rest of the notches). Thus, the manual plate with the five notches formed therein can be shared between the 4-position automatic transmission and the 5-position automatic transmissions only by changing the position of the case-side stopper surface.

Other features and advantages of the present invention will become apparent from the following detailed description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

The present invention will now be described in detail with reference to the drawings showing a preferred embodiment thereof.

In the embodiment of the present invention, a manual plate is applied to an automatic transmission having four ranges (four positions) and an automatic transmission having five ranges (five positions).

Figure 1:
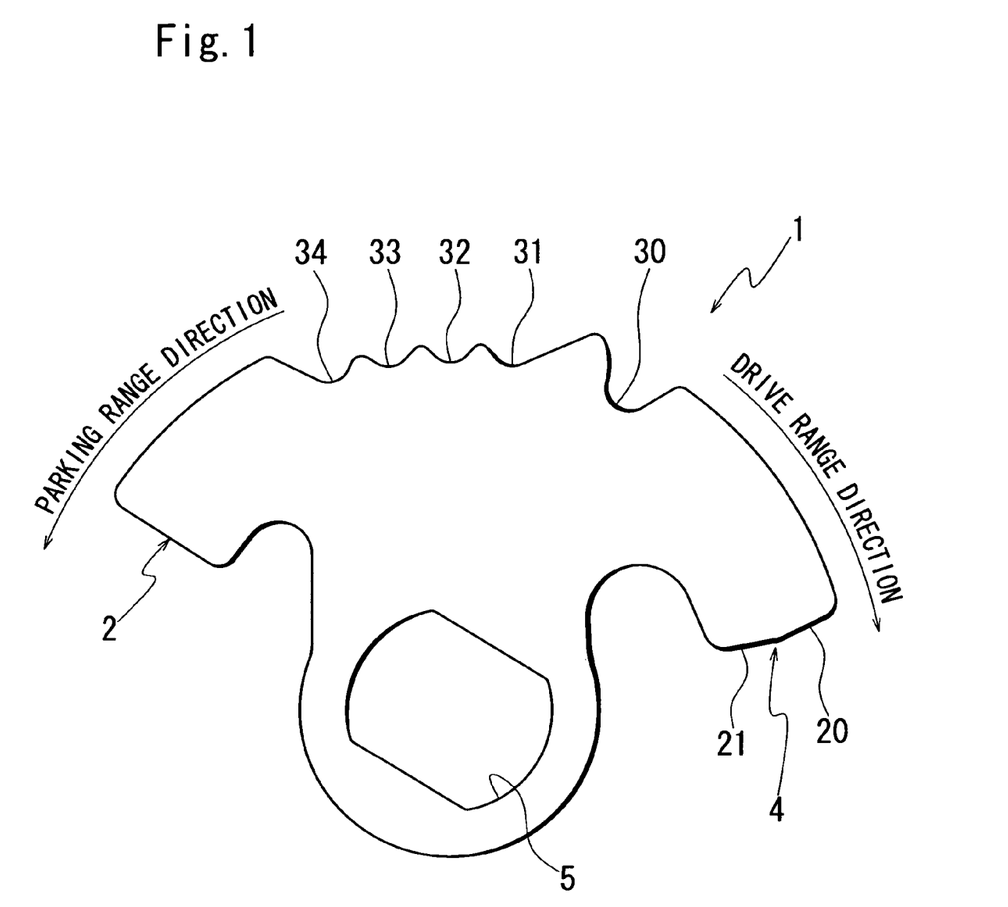
FIG. 1 is a view showing a manual plate according to an embodiment of the present invention.

FIG. 1 is an overall view of a manual plate 1.

A shaft hole 5 is formed at the center of an arc of the manual plate 1 that is substantially fan-shaped.

In the present embodiment, it is assumed that the manual plate 1 is formed of a metal plate with a thickness of about 3 mm, for example.

A parking range notch 30, a reverse rang notch 31, a neutral range notch 32, a driver range notch 33, and a low rang notch 34 associated with a parking range, a reverse range, a neutral range, a driver range, and a low range, respectively, are formed at an arc-shaped outer peripheral edge of the substantially fan-shaped manual plate 1.

The notches 30 to 34 are formed in this order from the right to the left of the arc-shaped manual plate 1 as viewed in FIG. 1.

The manual plate 1 is configured to rotate about a shaft inserted into the shaft hole 5, which will be described later in further detail. The rotational direction toward the parking range notch 30 (i.e. the rightward rotational direction as viewed in FIG. 1) is regarded as a drive range direction (one direction), and the rotational direction toward the low range notch 34 (i.e. the leftward rotational direction as viewed in FIG. 1) is regarded as a parking range direction (the other direction).

A plate-side parking range direction stopper surface 2 is provided at an end of the manual plate 1 in the parking range direction, and a plate-side drive range direction stopper surface 4 is provided at an end of the manual plate 1 in the drive range direction.

The plate-side drive range direction stopper surface 4 is formed with a 5-position stopper surface 20 (reference plate-side stopper surface) and a 4-position stopper surface 21 (the other plate-side stopper surface) aslant to the 5-position stopper surface 20.

The 4-position stopper surface 21 is formed closer to the rotational center of the manual plate 1 than the 5-position stopper surface 20.

The 5-position stopper surface 20 and the 4-position stopper surface 21 as well as the notches 30 to 34 at the arc-shaped outer peripheral edge of the substantially fan-shaped manual plate 1 are formed by press working at the same time.

Each of mountain shapes between the notches formed at the outer peripheral edge of the manual plate 1 is set such that a suitable control force is applied when the driver performs shifting. In particular, the height of the mountain shape between the parking range notches 30 and the reverse range notches 31 is set to be greater as compared with the other mountain shapes so that when the driver makes a shift from the parking range to the reverse range and when the driver makes a shift from the reverse range to the parking range, a greater control force is required as compared with other shifting.

Next, a description will be given of the case where the manual plate 1 is applied to a 5-position automatic transmission, i.e. an automatic transmission with five ranges: a parking range, a neutral range, a reverse range, a drive range, and a low range.

Figure 2:
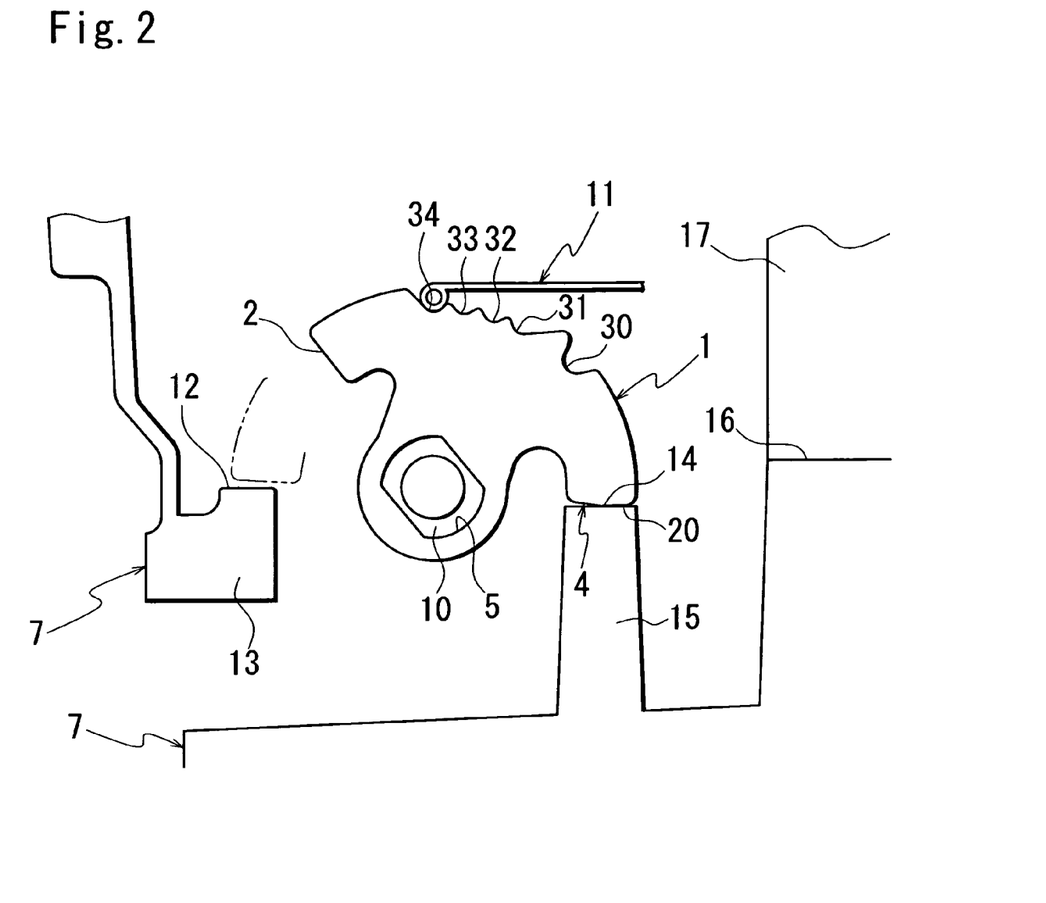
FIG. 2 is a view showing a manual plate mounting structure in the case where the manual plate is applied to a 5-position automatic transmission.

FIG. 2 illustrates how the manual plate 1 is mounted in the 5-position automatic transmission.

The manual plate 1 is connected to the shaft 10 by inserting a shaft 10 into the shaft hole 5.

The manual plate 1 rotates with the shaft 10 about the axis of the shaft hole 5.

An end of a check member 11 formed of a plate spring is fitted into the notches ranging from the parking range notch 30 to the low range notch 34, which are formed in the manual plate 1. It should be noted that FIG. 2 illustrates a state in which the end of the check member 11 is fitted into the low range notch 34.

Also, the end of the check member 11 is pressed against the manual plate 1 (downward as viewed in FIG. 2) by force of the plate spring.

When the driver performs a selecting operation by moving a shift lever, the manual plate 1 rotates with the shaft 10 in response to the driver's operation.

The shaft 10 is connected to a manual valve, not shown, which is provided in a control valve body 17, via a connecting element, not shown. The rotation of the shaft 10 changes the manual valve to a predetermined state so that the automatic transmission can be brought to a desired shifting state.

On this occasion, the end of the check member 11 is fitted into a desired one of the notches ranging from the parking range notch 30 to the low range notch 34 to give a crisp feel to the selecting operation, notifying the driver of a shift in range.

Next, a description will be given of a stopper structure that prevents over-stroke of the manual plate 1 in the rightward rotational direction or the leftward rotational direction as viewed in FIG. 1.

Here, when the driver performs the selecting operation to make a shift from the parking range to the low range, the manual plate 1 rotates in the rightward rotational direction (drive range direction) as viewed in FIG. 1. On the other hand, when the driver performs the selecting operation to make a shift from the low range to the parking range, the manual plate 1 rotates in the leftward rotational direction (parking range direction) as viewed in FIG. 1.

As shown in FIG. 2, in a 5-position transmission case 7, a case-side parking range direction stopper 13 is formed in opposed relation to the plate-side parking range direction stopper surface 2. A case-side parking range direction stopper surface 12 is formed in part of the case-side parking range direction stopper 13 which is brought into contact with the plate-side parking range direction stopper surface 2.

The rotation of the manual plate 1 causes the plate-side parking range direction stopper surface 2 to make surface contact with the case-side parking range direction stopper surface 12.

Also, in the 5-position transmission case 7, a case-side drive range direction stopper 15 is formed in opposed relation to the plate-side drive range direction stopper surface 4. A case-side drive range direction stopper surface 14 is formed in part of contact between the case-side drive range direction stopper 15 which is brought into contact with the plate-side drive range direction stopper surface 4.

The rotation of the manual plate 1 in the drive range direction causes the 5-position stopper surface 20 of the plate-side drive range direction stopper surface 4 to make surface contact with the case-side drive range direction stopper surface 14.

Also, a control valve body mounting surface 16 is formed in the transmission case 7; the control valve body 17 is mounted on the control valve body mounting surface 16.

The case-side drive range direction stopper surface 14 is formed parallel to the control valve body mounting surface 16.

The case-side parking range direction stopper surface 12 is formed parallel to the case-side drive range direction stopper surface 14.

Since the case-side parking range direction stopper 13 and the case-side drive range direction stopper 15 are formed in the parking range direction and the drive range direction, respectively, of the manual plate 1, the rotational range of the manual plate 1 can be limited to prevent over-stroke thereof.

Thus, in the case where the manual plate 1 is applied to the 5-position automatic transmission, the rotational range of the manual plate 1 corresponds to the range where the end of the check member 11 is fitted into the five notches ranging from the parking range notch 30 to the low range notch 34.

Next, a description will be given of the case where the manual plate 1 is applied to a 4-position automatic transmission, i.e. an automatic transmission with four ranges: a parking range, a neutral range, a reverse range, and a drive range.

Figure 3:
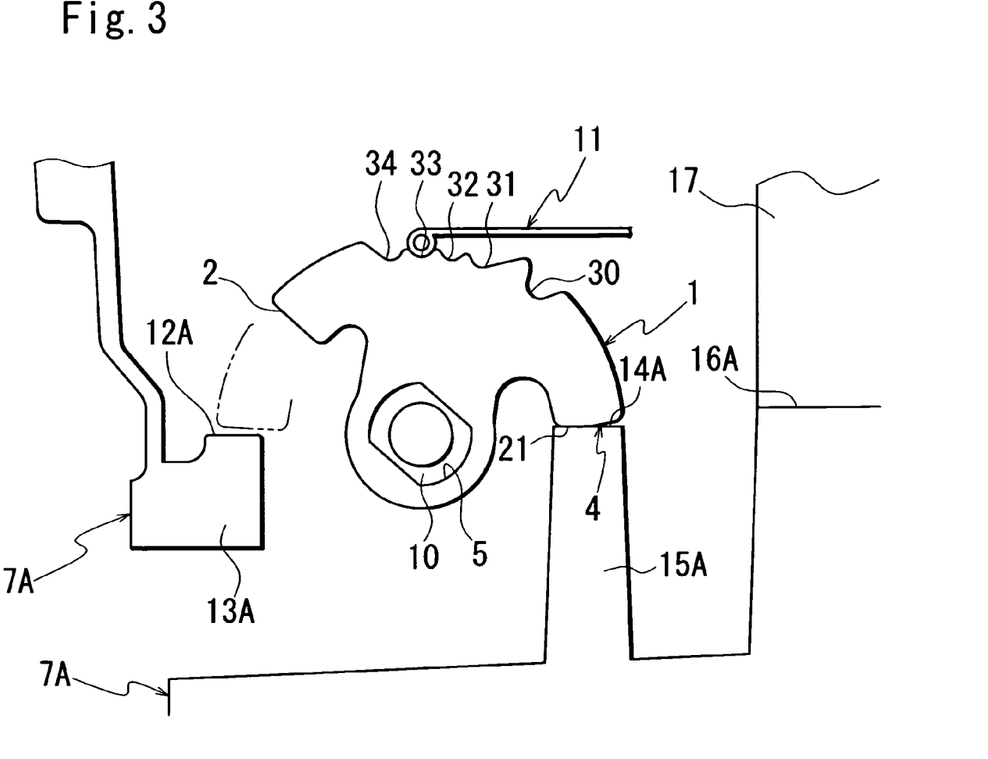
FIG. 3 is a view showing a manual plate mounting structure in the case where the manual plate is applied to a 4-position automatic transmission.

FIG. 3 illustrates how the manual plate 1 is mounted in the 4-position automatic transmission.

It should be noted that the positional relationship between the center of the shaft hole 5 formed in the manual plate 1, a case-side parking range direction stopper surface 12A formed in a case-side parking range direction stopper 13A of a 4-position transmission case 7A, and the end of the check member 11 is the same as that in the 5-position automatic transmission described above.

In the case where the manual plate 1 is applied to the 4-position automatic transmission, a case-side drive range direction stopper 15A is extended upward as viewed in FIG. 3 farther than the case-side drive range direction stopper 15 appearing in FIG. 2, and the height of the case-side drive range direction stopper 15A is set such that the rotational range of the manual plate 1 is narrowed.

The height of the case-side drive range direction stopper 15A is set such that the end of the check member 11 is fitted into the drive range notch 33 when the manual plate 1 is rotated in the drive range direction to bring the plate-side drive range direction stopper surface 4 into contact with a case-side drive range direction stopper surface 14A formed in the case-side drive range direction stopper 15A.

On the other hand, the end of the check member 11 is fitted into the parking range notch 30 when the manual plate 1 is rotated in the parking range direction to bring the plate-side parking range direction stopper surface 2 into contact with the case-side parking range direction stopper surface 12A.

Thus, the rotational range of the manual plate 1 corresponds to the range where the end of the check member 11 is fitted into the four notches ranging from the parking range notch 30 to the drive range notch 33.

The case-side drive range direction stopper surface 14A is formed parallel to a control valve body mounting surface 16A for mounting the control valve body 17 thereon.

The rotation of the manual plate 1 in the drive range direction causes the 4-position stopper surface 21 of the plate-side drive range direction stopper surface 4 to make surface contact with the case-side drive range direction stopper surface 14A.

The case-side parking range direction stopper surface 12A is formed parallel to the case-side drive range direction stopper surface 14A.

According to the present embodiment constructed as described above, the heights of the case-side drive range direction stoppers 15 and 15A that limits the rotational range of the manual plate 1 are selectively set such that the end of the check member 11 is fitted into the five notches ranging from the parking range notch 30 to the low range notch 34 in the case where the manual plate 1 is applied to the 5-position automatic transmission as shown in FIG. 2, and the end of the check member 11 is fitted into the four notches ranging from the parking range notch 30 to the drive range notch 33 in the case where the manual plate 1 is applied to the 4-position automatic transmission as shown in FIG. 3. As a result, a desired crisp feel suitable for the number of gear positions can be obtained by sharing the manual plate 1 between the 4-position and 5-position automatic transmissions.

Therefore, merely by changing the height of the case-side drive range direction stopper 15, 15A, the manual plate 1 can be shared between automatic transmissions differing in the numbers of gear positions, and the kinds of parts can be reduced.

Specifically, four kinds of parts consisting of a 4-position transmission case, a 5-position transmission case, a 4-position manual plate, and a 5-position manual plate have conventionally been required, but in the present embodiment, only three kinds of parts consisting of the 4-position transmission case 7A, the 5-position transmission case 7, and the manual plate 1 are required.

Also, since the plate-side drive range direction stopper surface 4 of the manual plate 1, which is brought into contact with the case-side drive range direction stoppers 15 and 15A differing in height, is formed with the 5-position stopper surface 20 and the 4-position stopper surface 21 aslant to the 5-position stopper surface 20, the plate-side drive range direction stopper surface 4 can make surface contact with the case-side drive range direction stopper surfaces 14 and 14A of the case-side drive range direction stoppers 15 and 15A even when the manual plate 1 is incorporated in the transmission cases 7 and 7A of the automatic transmissions differing in the numbers of gear positions, so that the area of contact can be prevented from wearing away.

Similarly, since the plate-side drive range direction stopper surface 4 of the manual plate 1 is formed with the 5-position stopper surface 20 and the 4-position stopper surface 21 aslant to the 5-position stopper surface 20 for the purpose of surface contact, the case-side drive range direction stopper surfaces 14 and 14A of the 5-position and 4-position transmission cases 7 and 7A do not have to be formed with a surface aslant to another machining surface (a predetermined reference surface such as the control valve body mounting surfaces 16 and 16A) for the purpose of surface contact, and they can be machined parallel with another machining surface, making it easier to machine the transmission cases and improving the accuracy of machining surface, therefore the machining costs can be reduced and the assembling accuracy can be improved.

Since the 5-position stopper surface 20 and the 4-position stopper surface 21 of the manual plate 1 can be easily formed by press working or the like, the surface contact between the manual plate 1 and the case-side drive range direction stopper surfaces 14 and 14A can be achieved at low machining cost.

It should be noted that in the case where automatic transmissions differ in the number of gear positions, a parking range, a reverse range, a neutral range, and a drive range are basically set in this order as ranges, and if there are more ranges, low-speed gear positions such as a low range are additionally set next to the drive range.

Therefore, in automatic transmissions differing in the number of gear positions, the manual plate 1 never rotates in the parking range direction (the leftward rotational direction as viewed in FIGS. 1 and 2) from the state in which the check member 11 is fitted in the parking range notch 30 of the manual plate 1. Thus, the position of the case-side parking range direction stopper surface 12 that limits the rotation of the manual plate 1 in the parking range direction is the same in automatic transmissions differing in the number of gear positions.

Also, the number of gear positions (the number of notches into which the check member 11 is to be fitted) can be determined depending on the amount by which the manual plate 1 is rotated in the drive range direction (the rightward rotational direction as viewed in FIGS. 1 and 2) from the state in which the check member 11 is fitted in the parking range notch 30 of the manual plate 1, and hence the number of gear positions of the automatic transmissions can be determined merely by selectively setting the heights of the case-side drive range direction stoppers 15 and 15A that limit the rotation of the manual plate 1 in the drive range direction.

A description will now be given of a variation.

This variation relates to a manual plate that can be applied to three types of automatic transmissions: 4-position, 5-position, and 7-position automatic transmissions.

Figure 4:
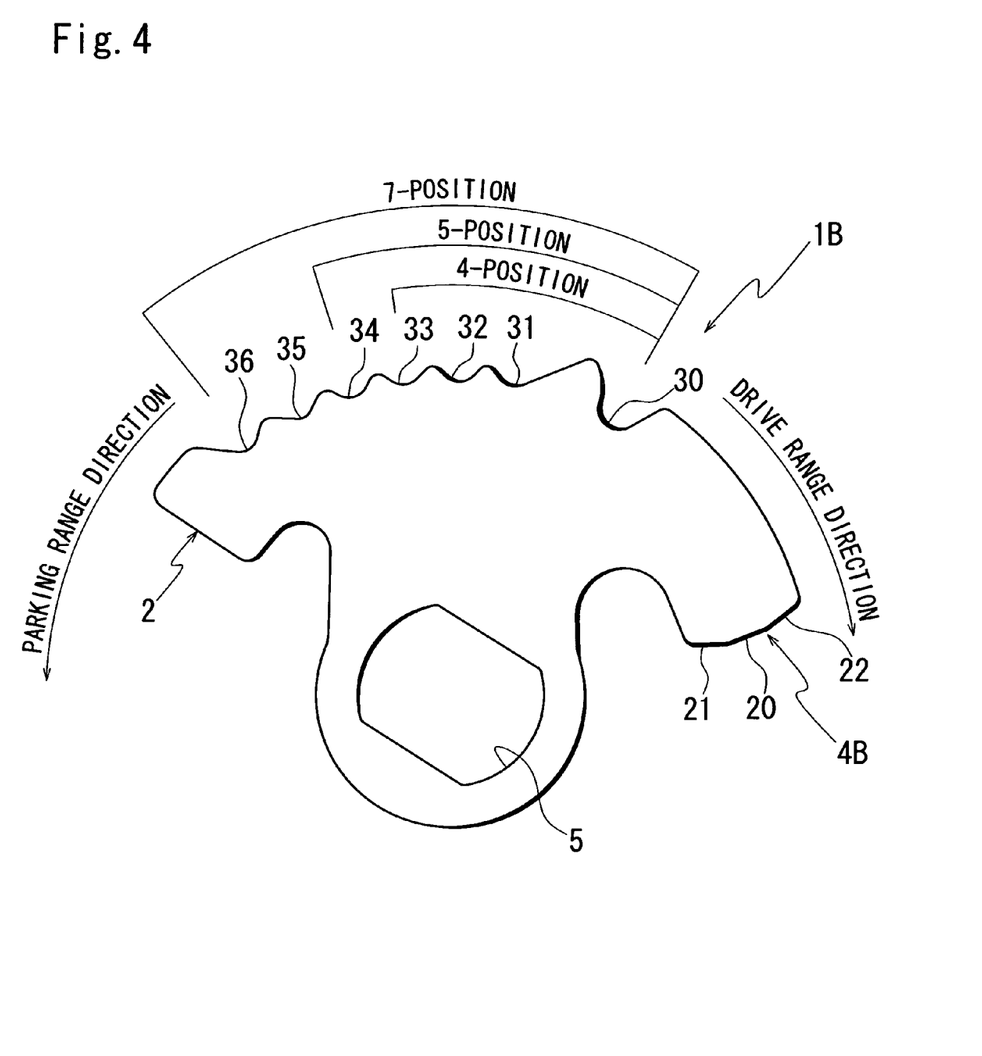
FIG. 4 is view showing a manual plate according to a variation.

FIG. 4 is an overall view of a manual plate 1B.

A 2nd range notch 35 associated with a 2nd range and a 3rd range notch 36 associated with a 3rd range as well as the five notches of the above described embodiment ranging from the parking range notch 30 to the low range notch 34 are formed at positions corresponding to an arc of the manual plate 1B that is substantially fan-shaped.

A plate-side drive range direction stopper surface 4B is provided on the drive range direction side of the manual plate 1B.

The plate-side drive range direction stopper surface 4B is formed with the 5-position stopper surface 20 (another plate-side stopper surface), the 4-position stopper surface 21 (another plate-side stopper surface), and a 7-position stopper surface 22 (a reference plate-side stopper surface), which are formed at different angles.

The 4-position stopper surface 21 is formed closest to the rotational center of the manual plate 1B. The 7-position stopper surface 22 is formed farthest from the rotational center of the manual plate 1B.

The other construction is the same as that in the above described embodiment, and therefore description thereof is omitted with identical elements and parts being denoted by identical reference numerals.

Next, a description will be given of the case where the manual plate 1B is applied to a 7-position automatic transmission, i.e. an automatic transmission with seven ranges: a parking range, a neutral range, a reverse range, a drive range, a 3rd range, a 2nd range, and a low range.

Figure 5:
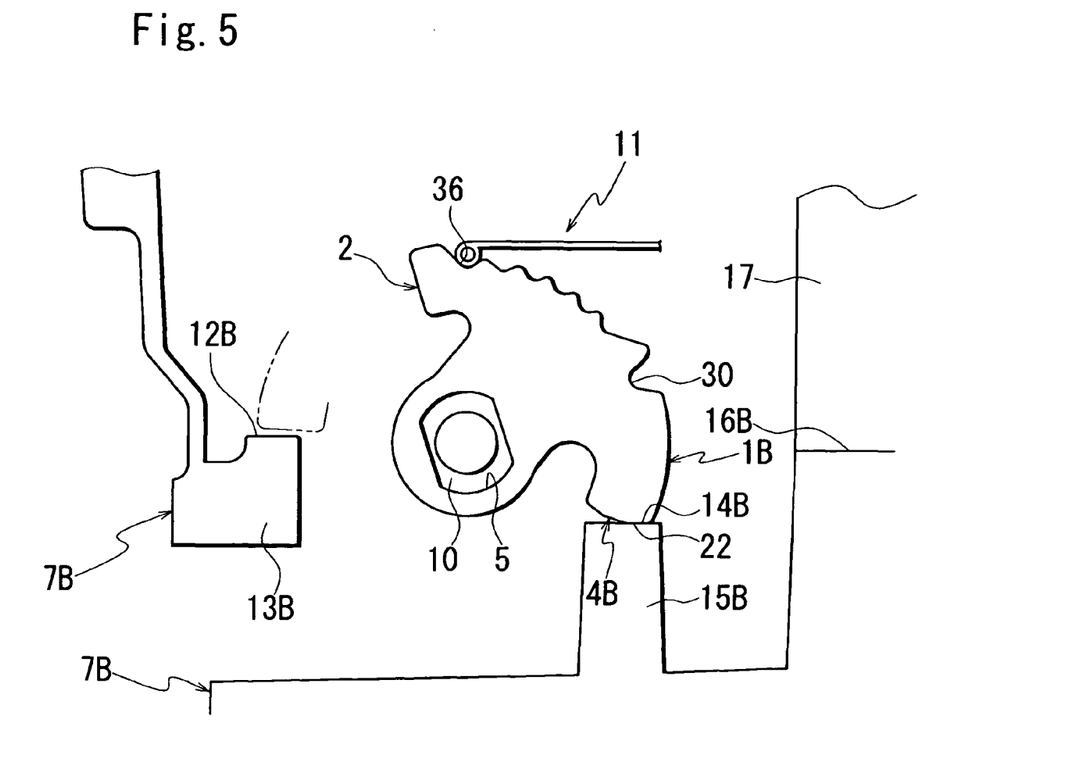
FIG. 5 is a view showing a manual plate mounting structure in the case where the manual plate is applied to a 7-position automatic transmission.

FIG. 5 illustrates how the manual plate 1B is mounted in the 7-position automatic transmission.

A transmission case 7B is comprised of a case-side parking range direction stopper surface 12B formed in a case-side parking range direction stopper 13B disposed in opposed relation to the plate-side parking range direction stopper surface 2, and a case-side drive range direction stopper surface 14B formed in a case-side drive range direction stopper 15B disposed in opposed relation to the plate-side drive range direction stopper surface 4B. The case-side parking range direction stopper surface 12B and the case-side drive range direction stopper surface 14B limit the rotational range of the manual plate 1B to prevent over-stroke of the manual plate 1B in both rotational directions.

Due to the arrangement of the case-side parking range direction stopper surface 12B and the case-side drive range direction stopper surface 14B, the rotational range of the manual plate 1B corresponds to the range where the end of the check member 11 is fitted into the seven notches ranging from the parking range notch 30 to the 3rd range notch 36.

Also, the 7-position stopper surface 22 formed in the plate-side drive range direction stopper surface 4B makes surface contact with the case-side drive range direction stopper surface 14B.

Next, a description will be given of the case where the manual plate 1B is applied to a 5-position automatic transmission and a 4-position automatic transmission.

Figure 6:
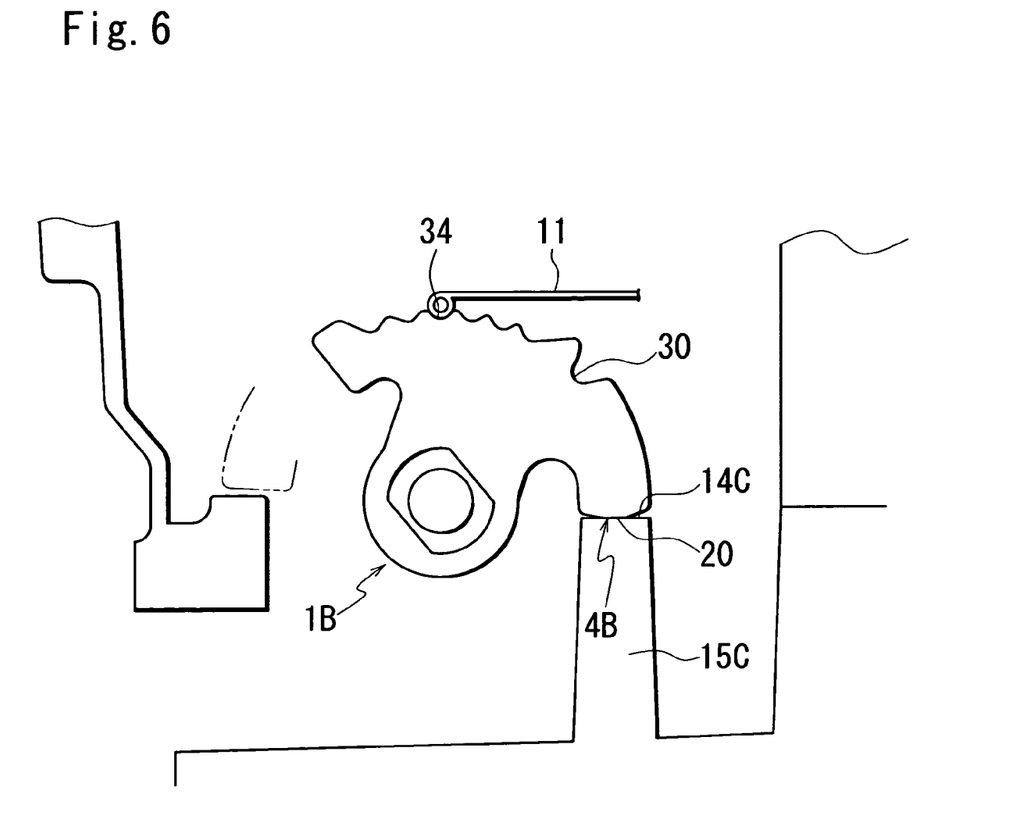
FIG. 6 is a view showing a manual plate mounting structure in the case where the manual plate is applied to a 5-position automatic transmission.
Figure 7:
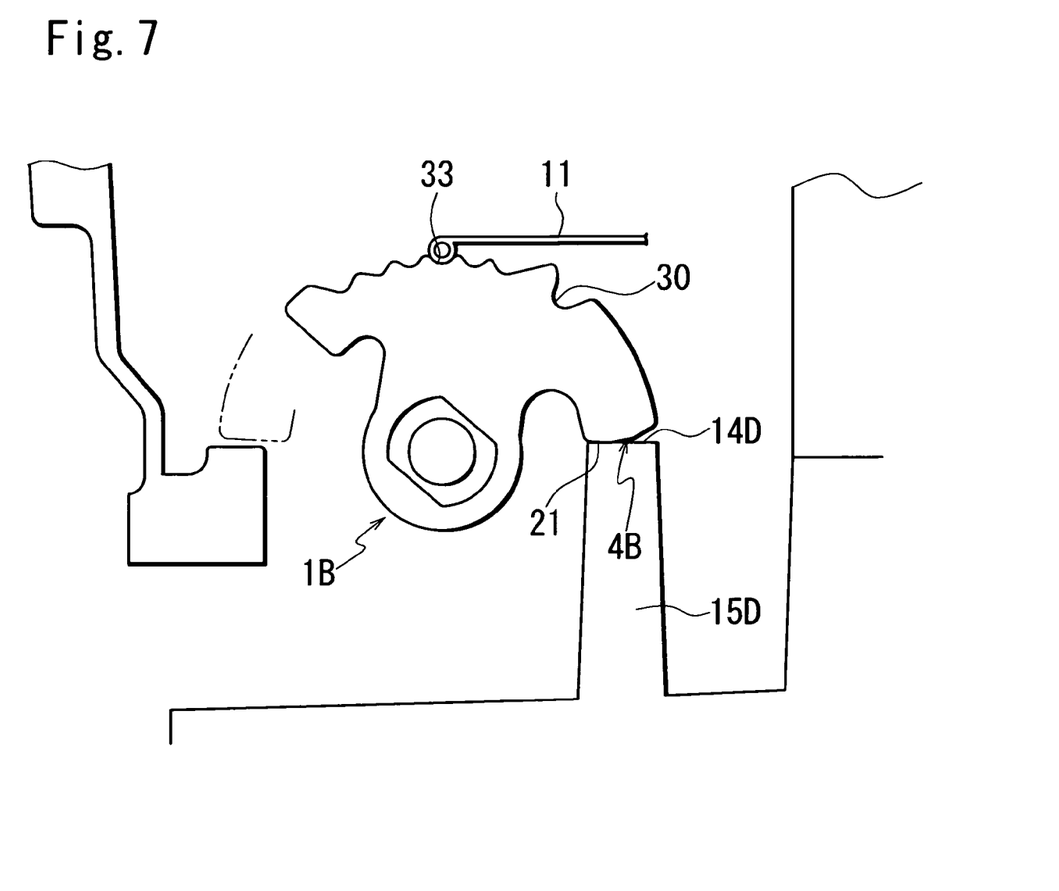
FIG. 7 is a view showing a manual plate mounting structure in the case where the manual plate is applied to a 4-position automatic transmission.

FIG. 6 illustrates how the manual plate 1B is mounted in the 5-position automatic transmission, and FIG. 7 illustrates how the manual plate 1B is mounted in the 4-position automatic transmission.

As shown in FIG. 6, in the case where the manual plate 1B is applied to the 5-position automatic transmission, the height of a case-side drive range direction stopper 15C is set to be greater than that of the case-side drive range direction stopper 15B appearing in FIG. 5 so as to narrow the rotational range of the manual plate 1B.

The rotational range of the manual plate 1B corresponds to the range where the end of the check member 11 is fitted into the five notches ranging from the parking range notch 30 to the low range notch 34.

Also, the 5-position stopper surface 20 formed in the plate-side drive range direction stopper surface 4B makes surface contact with a case-side drive range direction stopper surface 14C formed in the case-side drive range direction stopper 15C.

As shown in FIG. 7, in the case where the manual plate 1B is applied to the 4-position automatic transmission, the height of a case-side drive range direction stopper 15D is set to be greater than that of the case-side drive range direction stopper 15C appearing in FIG. 6 so as to further narrow the rotational range of the manual plate 1B.

The rotational range of the manual plate 1B corresponds to the range where the end of the check member 11 is fitted into the four notches ranging from the parking range notch 30 to the drive range notch 33.

Also, the 4-position stopper surface 21 formed in the plate-side drive range direction stopper surface 4B makes surface contact with a case-side drive range direction stopper surface 14D formed in the case-side drive range direction stopper 15D.

In the present variation, the same effects as those in the above described embodiment can be obtained; e.g. by setting the case-side drive range direction stoppers 15B, 15C, and 15D to predetermined heights so as to limit the rotational range of the manual plate 1B to predetermined ranges, a desired crisp feel suitable for the number of gear positions can be obtained by using the same manual plate 1B for the 4-position, 5-position, and 7-position automatic transmissions.

It is to be understood that in the present invention, the number of types of manual plate to be shared and the number of gear positions of automatic transmission are not limited to those mentioned above. For example, although in the variation, the same manual plate 1B is used for the three types of automatic transmissions consisting of the 4-position, 5-position, and 7-position automatic transmissions, the manual plate 1B may be shared between four or more types of automatic transmissions, or a manual plate with eight or more notches formed therein (a manual plate adaptable to automatic transmissions with eight or more positions) may be shared between automatic transmissions.

Further, it goes without saying that the number of surfaces to be formed at different angles in the plate-side drive range direction stopper surface of the manual plate is preferably not less than the number of automatic transmissions differing in the number of gear positions, which share the manual plate.

What is claimed is:

1. A structure for setting a different number of gear positions for an automatic transmission having a shift lever and a plurality of gear positions selectable with the shift lever, the structure comprising:

a transmission case selectable among a first transmission case and a second transmission case, the first transmission case having a first case-side stopper surface at a first abutting position that sets a first number of gear positions and the second transmission case having a second case-side stopper surface at a second abutting position that sets a second number of gear positions, the second number of gear positions being at least one less than the first number of gear positions;

a manual plate formed with a plurality of notches at an edge thereof and rotatably mountable in either of the first or second transmission case so that the manual plate is rotatable in response to a movement of the shift lever; and a check member for holding the manual plate in position, wherein the manual plate has at least first and second plate-side stopper surfaces, wherein the first plate-side stopper surface of the manual plate abuts the first case-side stopper surface at the first abutting position to limit a rotational range of the manual plate in a first direction to set the first number of gear positions selectable with the shift lever when the transmission case is the first transmission case, wherein the second plate-side stopper surface of the manual plate abuts the second case-side stopper surface at the second abutting position to limit the rotational range of the manual plate in the first direction to set the second number of gear positions selectable with the shift lever when the transmission case is the second transmission case, wherein the check member engages one of the notches when the first plate-side stopper surface abuts the first case-side stopper surface at the first abutting position, wherein the check member engages a different one of the notches when the second plate-side stopper surface abuts the second case-side stopper surface at the second abutting position, and wherein the first abutting position is positioned differently from the second abutting position to enable the manual plate to be rotated further in the first direction when the first number of gear positions is set to be selectable than when the second number of gear positions is set to be selectable, so that the check member engages the one notch when the manual plate is rotated further in the first direction than when the check member engages the different one notch, wherein the first and second plate-side stopper surfaces are angled to each other, and the second abutting position is configured to inhibit the manual plate from rotating further in the first direction to inhibit the check member from engaging the one notch when the second plate-side stopper surface abuts the second case-side stopper surface.

2. The structure according to claim 1, wherein:
the transmission case is also selectable from a third transmission case having a third case-side stopper surface at a third abutting position that sets a third number of gear positions, the manual plate has a third plate-side stopper surface configured to abut the third case-side stopper surface when the transmission case is the third transmission case, and the third plate-side stopper surface is angled to both the first and second plate-side stopper surfaces.

3. An automatic transmission system comprising:
a first automatic transmission having a first transmission case, a first check member, and a predetermined number of gear positions;

a second automatic transmission having a second transmission case, a second check member, and a larger number of gear positions than the predetermined number; and a manual plate that is interchangeable in the first and second automatic transmissions, wherein the manual plate has a plurality of notches and first and second stopper portions, wherein each of the first and second check members is engageable with at least one of the notches of the manual plate to control and maintain a rotational position of the manual plate provided in either the first or second automatic transmission, wherein each of the first and second transmission cases has first and second abutment parts, wherein the manual plate is rotabably mounted to either of the first or second automatic transmission so that the manual plate is rotatable in first and second directions, wherein the first stopper portion abuts the first abutment part and stops the manual plate from rotating in the first direction when the manual plate provided in the first or second automatic transmission is rotated in the first direction, wherein the second stopper portion abuts the second abutment part and stops the manual plate from rotating in the second direction when the manual plate provided in the first or second automatic transmission is rotated in the second direction, wherein positions of the first abutment parts of the first and second transmission cases are different so that the position of the first abutment part of the first transmission case is different from the position of the first abutment part of the second transmission case, and wherein the first stopper portion of the manual plate prevents the first check member from engaging at least one of the notches when the manual plate is provided in the first automatic transmission and permits the second check member to engage the at least one notch when the manual plate is provided the second automatic transmission the first stopper portion of the manual plate has at least first and second stopper surfaces, the first stopper surface abuts the first abutment part of the first transmission case when the manual plate is provided in the firs automatic transmission, and the second stopper surface abuts the first abutment part of the second transmission case when the manual plate is provided in the second automatic transmission, and wherein the first and second stopper surfaces are angled to each other.

4. The automatic transmission system according to claim 3, further including:
a third automatic transmission having a third transmission case, a third check member, and a larger number of gear positions than the second automatic transmission, wherein:

the manual plate has a third stopper surface that abuts the first abutment part of the third transmission case, and the third stopper surface is angled to both the first and second stopper surfaces.

* * * * *